United States Patent Office 3,493,332
Patented Feb. 3, 1970

3,493,332
PROCESS FOR PRODUCING CALCIUM CHLORIDE
Franz Petio, Ranzel, Karl Hass, Niederkassel, and Herbert Ottersky, Ranzel, Germany, assignors to Dynamit Nobel Aktiengesellschaft, Troisdorf, Germany, a corporation of Germany
No Drawing. Filed Jan. 3, 1967, Ser. No. 606,570
Claims priority, application Germany, Jan. 5, 1966, D 49,083
Int. Cl. C01f *11/30;* B01d *9/02, 1/14*
U.S. Cl. 23—90                          3 Claims

ABSTRACT OF THE DISCLOSURE

An improved process of producing desiccant quality calcium chloride by the evaporation and dehydration of an aqueous solution of calcium chloride where the solution contains, in addition to the calcium chloride, calcium chlorate in a proportion of about 1 to 20 parts of calcium chlorate per 100 parts of calcium chloride, and where the evaporation and dehydration is carried out in a zone which is direct heated by a flame having a temperature of about 1600 to 1700° C. The product produced is calcium chloride having an internal surface area of at least about 0.09 sq. meter per gram.

---

This invention relates to the production of calcium chloride which is particularly well suited to use as a desiccant.

Calcium chloride is a known desiccant which is conventionally made by evaporating and dehydrating an aqueous solution calcium chloride to produce a particulate product. Drying, or at least the ability to extract moisture by a desiccant, such as calcium chloride, is a physical matter. That is, this type of drying and the efficiency thereof is closely related to the surface area per unit weight of the desiccant. It is known that, in general, the surface area per unit weight of any given material increases as the particle size of the material decreases. Therefor, it has been attempted to increase the desiccant capacity and efficiency of calcium chloride by utilizing increasingly smaller particle size material.

Calcium chloride is often used for drying (absorbing moisture from) gases. In this operation, the gas to be dried is often passed through a bed of particulate calcium chloride. As it has become desirable to increase the drying efficiency of such desiccant beds, the art has generally tended to decrease the desiccant particle size. This has led to two relatively major problems. In the first place, as the particle size of the desiccant decreases, the pressure drops across the bed increases due to the decreased channel volume through the bed. Therefor, it has been necessary to increase the pressure on the gas feed in order to maintain an adequate throughput. Further, as the desiccant particle size decreases, it becomes increasingly easier to entrain desiccant particles in the gas stream being treated. This entrainment problem can be counteracted by decreasing the gas velocity which decrease effectively reduces the throughput. Thus, according to prior art practice, an increase in the efficiency of the desiccant has had attendant thereon a decrease in throughput of the gas being dried.

It is an object of this invention to provide a calcium chloride which is capable of improved desiccation without reduced throughput as compared with prior art.

It is another object of this invention to provide a process for producing the improved calcium chloride referred to above.

Other and additional objects of this invention will become apparent from a consideration of this entire specification including the claims appended hereto.

In accord with and fulfilling these objects, one aspect of this invention resides in a process which comprises dehydrating a calcium chloride aqueous solution containing calcium chlorate to produce high internal surface area particulate calcium chloride. The calcium chloride producing according to this invention has an internal surface area of at least about 0.15 square meter per gram.

Internal surface areas of the product calcium chloride are measured according to the areameter method which is a simplified Brunnauer-Emment-Teller method.

According to this invention, calcium chloride is produced in exactly the same manner as in the prior art, that is an aqueous solution of calcium chloride is evaporated to complete dryness, except that calcium chlorate is added to the aqueous solution. The calcium chlorate decomposes during evaporation to calcium chloride and evolves an oxygen gas. It has been found practical to employ about 1 to 20 parts by weight of calcium chlorate per 100 parts of calcium chloride in the aqueous solution. It is preferred to use about 2 to 10 parts of calcium chlorate per 100 parts of calcium chloride in solution.

It is preferred to remove the solvent water and the water of crystallization from the calcium chloride solution in the conventional manner, e.g. by means of a rotary kiln which may be direct fried or heated in other ways. The product produced has a relatively large grain size and a very large internal surface area.

The following example is illustrative of the practice of this invention without in any way being limiting thereon:

EXAMPLE

In a rotary kiln with direct flame heating by a large number of flame jets distributed over the entire length of the bed of material, calcium chloride balls with a diameter of about 14 to 40 mm. are manufactured in a prior-art manner from granulated calcium chloride by spraying into the kiln a 40% aqueous calcium chloride solution at flame temperatures of about 1600 to 1700° C., and the internal surface area is determined.

The following table shows that, even with a relatively small addition of calcium chlorate, the internal surface area of the calcium chloride is substantially increased.

TABLE

| Calcium chlorate content in the calcium chloride solution (g./liter): | Internal surface area of the spherical calcium chloride (m.$^2$/g.) |
|---|---|
| 0 | 0.03 |
| 20 | 0.09 |
| 27 | 0.15 |
| 40 | 0.22 |

What is claimed is:
1. In the process of producing calcium chloride by the evaporation and dehydration of an aqueous solution of calcium chloride, the improvement which comprises providing in said aqueous solution calcium chlorate in a proportion of about 1 to 20 parts by weight per 100 parts by weight of calcium chloride, and carrying out said evaporation and dehydration of said mixed aqueous solution, utilizing direct heating at a source temperature of about 1600 to 170° C. for said evaporation and dehydration, whereby producing a calcium chloride product having an internal surface area of at least about 0.09 sq. meter per gram.

2. The improved process claimed in claim 1 wherein said calcium chlorate is initially present in said solution in a proportion of about 2 to 10 parts by weight per 100 parts by weight of calcium chloride.

3. The improved process claimed in claim 1, wherein said evaporation and dehydration is carried out in a kiln fired with a flame having a temperature of about 1600 to 1700° C.

References Cited

UNITED STATES PATENTS

| | | | |
|---|---|---|---|
| 1,689,775 | 10/1928 | Chandler | 23—90 XR |
| 1,887,809 | 11/1932 | Heath. | |
| 1,922,697 | 8/1933 | Heath | 23—90 |
| 2,646,343 | 7/1953 | Bennett et al. | 23—90 |

EDWARD STERN, Primary Examiner

U.S. Cl. X.R.

252—194

PO-1050
(5/69)

UNITED STATES PATENT OFFICE
CERTIFICATE OF CORRECTION

Patent No. 3,493,332  Dated Feb. 3, 1970

Inventor(s) FRANZ PETIO, KARL HASS, and HERBERT OTTERSKY

It is certified that error appears in the above-identified patent and that said Letters Patent are hereby corrected as shown below:

Column 2, line 63, "170° C." should be --1700° C.--

SIGNED AND
SEALED
JUL 7 1970

(SEAL)
Attest:

Edward M. Fletcher, Jr.
Attesting Officer

WILLIAM E. SCHUYLER, JR.
Commissioner of Patents